United States Patent Office 3,192,220
Patented June 29, 1965

3,192,220
REDUCTION OF ISONICOTINIC ACID ESTERS
John A. Pianfetti, Baltimore, Md., assignor to FMC Corporation, New York, N.Y., a corporation of Delaware
No Drawing. Filed June 13, 1962, Ser. No. 202,068
4 Claims. (Cl. 260—293.2)

This invention relates to the production of alcohols such as 3-quinuclidinol (1-azabicyclo[2,2,2]-3-octanol), and their esters.

3-quinuclidinol and allied alcohols, and the esters thereof, are described in the Sternbach U.S. Patent 2,648,667, issued August 11, 1953. As described in that patent, the compounds have utility in the field of medicine, especially as spasmolytics. The method described in that patent for the production of the alcohols involves a four-step synthesis, starting with a known pyridine derivative. For 3-quinuclidinol, the process involves: (1) conversion of methyl isonicotinate to a 1-carbalkoxymethyl-4-carbalkoxy piperidine by reaction with a lower alkyl ester of a haloacetic acid and hydrogenation of the resulting quaternary salt, (2) ring closure of the product by a Dieckmann condensation to the corresponding bicyclic keto ester, (3) hydrolysis and decarboxylation of the ester to 3-quinuclidinone, and (4) reduction of 3-quinuclidinone to 3-quinuclidinol. The alcohol is then converted into the desired ester by one of a number of different esterification techniques.

The syntheses so described are both time consuming and costly, involving the separation and purification of two intermediates before the desired bicyclic alcohol is produced. Yields leave much to be desired, and many of the reactions are difficult to operate on larger than a laboratory scale, since many of the reaction media present serious handling problems.

This invention has as its primary object improving the process for making 3-quinuclidinol, whereby yields are increased, costs are reduced, and handling difficulties are minimized. More particularly, this invention has as its object an improvement in the first step of the process, whereby a crude product is produced in high yield under relatively mild conditions, which product can be carried on into the next step of the synthesis without being isolated from the reaction medium.

The known process for converting methyl isonicotinate to 1-carbomethoxymethyl-4-carbomethoxy piperidine involves treatment with an alkyl (preferably methyl) ester of chloracetic acid, preferably in methanol solvent, in the presence of stoichiometric quantities of sodium bromide (alternately, using an ester of bromoacetic acid) to produce the quaternary bromide, followed by hydrogenation, using platinum oxide as the catalyst. The method is objectionable because of high reagent costs (platinum oxide and bromine) and corrosion problems, glass-lined equipment being necessary.

Hydrogenation of the double bonds of the pyridine ring of methyl isonicotinate to produce methyl isonipecotate, followed by simple alkaline condensation with alkyl (preferably methyl) chloroacetate, presents an attractive alternate to the above process, but the literature indicates that either extreme conditions are necessary for hydrogenating aromatic double bonds (temperatures above 150° C. and pressures of the order of 70 to 100 atmospheres), or very large quantities of catalyst are required, or the very expensive catalyst rhodium must be used in higher than normal concentrations.

I have discovered that, contrary to the teaching of the literature, methyl isonicotinate can be reduced to methyl isonipecotate, by hydrogenation under relatively mild conditions (temperatures from about 35° C. to 150° C., and preferably about 60° C. to 100° C., and pressures from just above atmospheric to about 500 p.s.i.g. and preferably about 50 to 150 p.s.i.g.) in the presence of a supported palladium catalyst (0.1 gram to 40 grams and preferably about 2 to 10 grams per mol of methyl isonicotinate). The catalyst may typically be 5% palladium on carbon. The reaction is conducted until about the theoretical quantity of hydrogen (95–105% of theory) has been absorbed. If desired, a solvent can be used.

The product, in solution in the solvent used during the reaction, or in added solvent, is separated from the catalyst, which is washed to recover product; it is then alkylated with molar proportions of methyl chloroacetate, and a base such as alkali metal hydroxide or carbonate, to produce the intermediate which is the starting material for the next step of the process—the modified Dieckmann condensation of step 2. This intermediate is not isolated; it is, however, preferably made into a hydrocarbon solution by adding a solvent such as xylene, distilling off the methanol and any other low boiling materials present, and finally removing insoluble salts by filtration to produce the crude product in hydrocarbon solution.

As indicated above, hydrogen is used in substantially theoretical amount (95–105%). Use of less than theoretical quantities reduces yield; substantially greater uptake of hydrogen causes side reactions which again reduce yield.

The catalyst concentration affects the time of reaction. With 10 grams of 5% palladium on carbon per gram mol of methyl isonicotinate, reaction times as low as 2 to 4 hours are obtained, using methanol (250 grams per mol of product) at 60 p.s.i.g. and 80° C.; under similar conditions, 4 grams of catalyst per gram mol require reaction times of 6 to 12 hours. When temperature and pressure are increased, reaction times are reduced, so that at higher temperatures and pressures, less catalyst can be used, down to as low as 0.1 gram per mol at the extremes of temperature and pressure. For the preferred conditions of temperature and pressure, about 2 to 10 grams of 5% supported palladium is preferred. The reaction at very low temperatures is very slow, even with high concentrations of catalyst; reasonable rates are obtainable with higher catalyst concentrations at about 35° C., and the rate increases with rise in temperature up to 150° C. I prefer to operate in the range of 60 to 100° C. as rates are as high as desirable at moderate pressures and with reasonably low catalyst loadings. In similar fashion, pressures from just above atmospheric to 500 p.s.i.g. may be used, with optimum results in the 50 to 150 p.s.i.g. range.

The reaction can be run in the absence of a solvent or diluent, but the presence of a solvent increases the reaction rate. With the methyl esters, methanol is a satisfactory solvent; from about half as much as methyl isonicotinate, to about three times as much as isonicotinate, is the preferred range. The solvent or diluent should be inert to the reactant. Aromatic and aliphatic hydrocarbons are also satisfactory inert solvents.

The following examples are typical of the invention, although not limiting thereto.

*Example 1*

Fifty-six grams (0.40 gram mol) of methyl isonicotinate and 100 grams methanol were charged into a hydrogenator, and 4 grams of 5% palladium on carbon catalyst were added. Hydrogen was admitted to the hydrogenator, maintained at 80° C. and 60 p.s.i.g. until 1.22 mols had been absorbed. This took three and a half hours. The crude reaction product (157 grams) was filtered from the catalyst, which was washed with 15 grams of methanol; 0.44 gram mol of monochloracetic acid and 0.46 gram mol of sodium carbonate were added, and the material refluxed for 2 hours. Eighty ml. of xylene wer added, and the methanol was distilled off.

The resultant slurry was filtered and the filter cake was washed with fresh xylene. The product which is contained in the combined filtrate is utilizable in the next step of the process as is, without isolation; yield 85 mol percent.

Two replications of the example, with recycled catalyst, required slightly longer reaction times, and gave 80 mol percent yield overall.

*Example 2*

The example was repeated, except that 139 grams (1.0 mol) of methyl isonicotinate was charged with 93 grams of methanol, and 4 grams of palladium on carbon catalyst, wet with 4 grams of water, was used. Hydrogen was introduced, and the reaction run at 60 p.s.i.g. and 80° C. 3.07 mols of hydrogen were adsorbed after 6⅓ hours. The product was filtered from the catalyst, which was washed with more methanol. Alkylation with methyl chloroacetate and sodium carbonate, followed by filtration and washing of the filter cake with xylene as in Example 1, gave a 78 mol percent yield overall.

*Example 3*

Repetition of the hydrogenation of Example 2 without the methanol, required 17 hours for completion. The yield was 85 mol percent, after hydrogenation.

Obviously, the examples can be multiplied indefinitely without departing from the scope of the invention as defined in the claims.

What is claimed is:

1. The method of reducing a lower alkyl ester of isonicotinic acid to the corresponding piperidine derivative which comprises reacting the ester with hydrogen at a temperature from 35 to 150° C., at a pressure from just above atmospheric to 500 p.s.i.g., in the presence of sufficient supported palladium catalyst to provide 0.005 to 2 grams of palladium per mol of the ester, and continuing the reaction until the theoretical quantity of hydrogen has been absorbed.

2. The method of reducing methyl isonicotinate to methyl isonipecotate which comprises reacting the methyl isonicotinate with hydrogen at a temperature from 60 to 100° C., and a pressure from 50 to 150 p.s.i.g. in the presence of 2 to 10 grams of a supported palladium catalyst containing 5% of palladium, per mol of the ester, until the theoretical quantity of hydrogen has been absorbed.

3. The method of claim 2 in which the reaction is carried out in the presence of an inert solvent.

4. The method of claim 2 in which the reaction is carried out in the presence of methanol.

References Cited by the Examiner

UNITED STATES PATENTS 2,759,942    8/56    Krapcho _____ 260—294.3

IRVING MARCUS, *Primary Examiner.*

NICHOLAS S. RIZZO, WALTER A. MODANCE,
*Examiners.*